United States Patent [19]

Miller

[11] 4,442,256
[45] Apr. 10, 1984

[54] ADDITIVE FOR ALKYD RESIN COATING COMPOSITIONS

[75] Inventor: Lester I. Miller, Troy, Mich.

[73] Assignee: E. I. Du Pont de Nemours and Company, Wilmington, Del.

[21] Appl. No.: 450,220

[22] Filed: Dec. 16, 1982

[51] Int. Cl.³ ........................... C09D 3/52; C09D 3/66
[52] U.S. Cl. ..................................... 524/539; 252/182; 524/590; 528/73; 528/289
[58] Field of Search ................... 528/73, 289; 524/539, 524/590; 252/182

[56] References Cited

U.S. PATENT DOCUMENTS 3,102,866  9/1963  Moffett et al. ..................... 524/407
3,228,787  1/1966  Haubert ............................. 428/458
3,789,037  1/1974  Miller ................................ 428/458
3,919,218  11/1975 Schmitt et al. ...................... 528/73
4,288,351  9/1981  Miller et al. ....................... 524/512
4,321,169  3/1982  Miller ................................ 524/512
4,359,541  11/1982 Patton et al. ....................... 528/73

*Primary Examiner*—Ronald W. Griffin
*Attorney, Agent, or Firm*—Hilmar L. Fricke

[57] ABSTRACT

An additive for alkyd resin coating compositions which is a blend of an isocyanate isocyanurate, dibutyltindilaurate and an organic solvent. Coating compositions containing this additive are used for coating automobiles and trucks and have good initial gloss and hardness and good gloss retention on weathering.

7 Claims, No Drawings

ADDITIVE FOR ALKYD RESIN COATING COMPOSITIONS

BACKGROUND OF THE INVENTION

This invention relates to an additive for alkyd resin coating compositions.

Alkyd resin coating compositions are well known in the art as shown in Moffett et al. U.S. Pat. No. 3,102,866 issued Sept. 3, 1963, and Haubert U.S. Pat. No. 3,228,787 issued Jan. 11, 1966. These compositions form good quality finishes but do not cure rapidly to hard, glossy, durable finishes which are required for repairing auto and truck bodies. The use of polyisocyanates in alkyd resin compositions to improve rate of cure and physical properties of the resulting finish is shown in Miller U.S. Pat. No. 3,789,037 issued Jan. 29, 1974. However, there is a need for a composition which forms finishes that cure rapidly, have improved gloss, hardness and gloss retention upon extended weathering.

The additive of this invention provides alkyd resin coating compositions with the aforementioned improvements.

SUMMARY OF THE INVENTION

An additive for alkyd resin based coating compositions which contains about 10-50% by weight of isocyanato isocyanurate having the formula

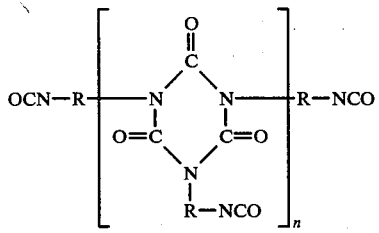

wherein R is

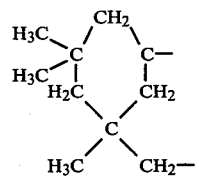

and n is an integer of 1-5,
0.5-5% by weight of the dibutyltindilaurate and
49.5-89.5% by weight of organic solvent.

DESCRIPTION OF THE INVENTION

To provide finishes of an alkyd resin based coating composition that have improved hardness, initial gloss and gloss retention and rapid cure in comparison to prior art compositions, about 1-50% by weight, based on the weight of the coating compositions, of the additive is blended with composition. Generally, the additive is blended with the composition shortly before it is applied, for example 1 minute-4 hours before application. If the additive is blended with the composition for a long period before application, gellation can occur or viscosity can increase to a level that would make application of the composition impossible.

The additive is a solution of 10-50% by weight of isocyanato isocyanurate having the formula

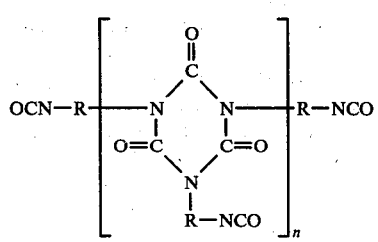

wherein R is

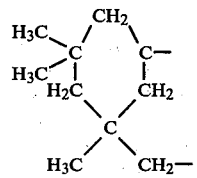

and n is an integer of 1-5.

The preparation of this isocyanato isocyanurate is described in Schmitt et al. U.S. Pat. No. 3,919,218 issued Nov. 11, 1975. Preferably, 3-isocyanatomethyl-3,5,5-trimethylcyclohexyl isocyanate is used to prepare the isocyanato isocyanurate. However, other isomers can also be used. Preferably, the isocyanato isocyanurate has a isocyanate functionality of 3.0-4.0. The additive also contains 0.5-5% by weight dibutyltindilaurate and 49.5-89.5% by weight of an organic solvent.

Preferably, the additive contains about 25-30% by weight of the isocyanurate, 1-3% by weight of dibutyltindilaurate and 69-74% by weight of toluene. Other organic solvents can also be used such as xylene, ethyl acetate, butyl acetate, methyl ethyl ketone, methyl isobutyl ketone and other esters and ketones.

Typical alkyd resin coating compositions which use the additive of this invention have a binder solids content of 10-60% by weight but preferably, have a 30-50% by weight binder solids content. These compositions can be clear or can contain pigment. If pigmented, a pigment to binder ratio of about 1:100 to 150:100 is used. The pigments are dispersed in an alkyd resin solution by usual procedures such as sand grinding, attritor grinding, ball milling and the like and then added to the coating composition.

Examples of the great variety of pigments which are used in the coating composition are metallic oxides, preferably titanium dioxide, zinc oxide, and the like, metal hydroxides, metal flakes, metal powders, chromates, such as lead chromate, sulfides, sulfates, carbonates, carbon black, silica, talc, china clay, iron blues, organic reds, maroons, organic dyes, lakes, and the like.

The alkyd resin used in the coating compositions is of drying oil or fatty acids of drying oil, an ester of an organic dicarboxylic acid constituent and a polyol and can contain up to 10% by weight of an ester of an aromatic monocarboxylic acid and a polyol and can contain up to 5% by weight of excess polyol. Preferably, the alkyd resin contains 30-65% by weight of a drying oil, 30-50% by weight of an ester of polyol and an aromatic dicarboxylic acid, 2-9% by weight of an ester of an aromatic monocarboxylic acid and a polyol and 2-5% by weight of excess polyol.

The alkyd resin is prepared by conventional techniques in which the constituents are charged into a reaction vessel along with an esterification catalyst and, preferably, a solvent, and heated to about 80°-200° C. for about 0.5-6 hours. Water is removed as the constituents are esterified. The resulting alkyd resin should have an acid number less than 30, and preferably, less than 15.

The following drying oils and fatty acids of drying oils are used to prepare the alkyd resin: tung oil, tall oil, linseed oil, dehydrated castor oil, soya oil, mixtures of these drying oils and fatty acids of these drying oils.

Any of the following acids or anhydrides or mixtures thereof are used to prepare the alkyd resin: maleic acid, maleic anhydride, phthalic acid, phthalic anhydride, isophthalic acid, terephthalic acid, succinic acid, glutaric acid, adipic acid, pimelic acid, suberic acid, azelaic acid and sebacic acid.

The polyol used to prepare the alkyd resin is one of the following: glycerol, ethylene glycol, propylene glycol, diethylene glycol, butane diol, trimethylol propane, trimethylol ethane, pentaerythritol, sorbitol, mannitol or mixtures of these polyols.

The following aromatic mono-carboxylic acids can be used to prepare the alkyd resin: benzoic acid, para-tertiary butylbenzoic acid, phenol acetic acid, triethyl benzoic acid and the like.

The following are preferred alkyd resins used in coating composition:

an alkyd resin of 25-50% by weight of linseed oil, 5-20% by weight of tung oil, 35-45% by weight of glycerol phthalate, 4-8% by weight of glycerol isophthalate, and 2-5% by weight of glycerine;

an alkyd resin of 35-55% by weight of soya oil, 35-50% by weight of pentaerythritol phthalate, 5-10% by weight of pentaerythritol butyl benzoate, and 2-6% by weight of pentaerythritol;

mixtures of the above alkyd resins can be used to form a high quality composition.

The alkyd resin coating composition can contain about 1-15% by weight, based on the weight of the binder, of an alkylated melamine formaldehyde resin having 1-4 carbon atoms in the alkyd group. Typical resins are fully and partially methylated melamine formaldehyde resins, methylatedbutylated melamine formaldehyde resins and the like.

To increase the rate of cure of the composition, it is preferred to add about 0.1-3% by weight, based on the weight of the binder, of a metallic drier. Typical driers that are used are, for example, nickel naphthenate, cobalt naphthenate, manganese naphthenate, lead tallate, metal salts of a 6-12 carbon atom saturated aliphatic monocarboxylic acid, such as nickel octoate, cobalt octoate, nickel caprylate, nickel-2-ethylhexoate and the like.

Plasticizers can be used in the coating composition in amounts up to 10% by weight of the binder. Polymeric plasticizers which can be used are epoxidized soya bean oil, oil free and oil modified alkyds and polyesters, such as polyorothophthalate esters, polyalkylene adipate esters or polyarylene adipate esters. Monomeric plasticizers that can be used are butylbenzyl phthalate, dibutyl phthalate, triphenyl phosphate, 2-ethylhexylbenzyl phthalate, dicyclohexyl phthalate, dibenzyl phthalate, butylcyclohexyl phthalate, mixed benzoic acid and fatty oil acid esters of pentaerythritol poly(propylene adipate)dibenzoate, diethylene glycol dibenzoate, tetrabutylthiodisuccinate, butyl phthalyl butyl glycolate, acetyltributyl citrate, dibenzyl sebacate, tricresyl phosphate, toluene ethyl sulfonamide and di-2-ethylhexyl ester of hexamethylene diphthalate, di(methylcyclohexyl)phthalate.

One to 20% by weight, based on the weight of the binder, of cellulose acetate butyrate can be used in the coating composition. The cellulose acetate butyrate preferably has a butyryl content of about 45-55% by weight and a viscosity of 0.1-6 seconds determined at 25° C. according to ASTM-D-1343-56.

The alkyd resin composition containing the additive of this invention can be used as a primary topcoat on automobiles and trucks or as a repair coat for damaged finishes. The resulting composition can be diluted to an application viscosity with any of the conventional solvents and thinners and can be applied by conventional techniques, such as brushing, spraying, electrostatic spraying, flow coating, dip coating, roller coating and the like. By choosing the desirable solvents and by varying the ratio of the solvents, the resulting composition can be provided with the physical properties required for the aforementioned application methods. The resulting finish is then air dried or can be force dried at about 100°-150° C. The resulting composition can be applied over primers, sealers and ground coats conventionally used on automobiles and trucks or may be applied directly over a sanded damaged paint to repair the finish.

The following example illustrates the invention. The parts and percentages are on a weight basis unless otherwise specified.

EXAMPLE 1

An additive (A) was prepared by blending the following constituents:

|  | Parts by Weight |
|---|---|
| Portion 1 | |
| Toluene | 512 |
| Dibutyltindilaurate | 18 |
| Portion 2 | |
| Isocyanato isocyanaurate (described above having an isocyanate functionality of 3-4 prepared from 3-isocyanatomethyl-3,5,5-trimethyl-cyclohexyl isocyanate | 237 |
| Total | 767 |

Portion 1 is mixed for 10 minutes and then portion 2 is added and mixed for 15 minutes.

An additive (B) representative of the prior art was prepared by blending the following constituents:

|  | Parts by Weight |
|---|---|
| Portion 1 | |
| Toluene | 521 |
| Alkyd resin (415.25 parts tall oil fatty acids, 355.92 parts glycidyl ester of tertiary carboxylic acid "Cardura" E ester, 0.83 epoxy resin catalyst DBVIII made by Argus Chemical Corp.) | 38 |
| Dibutyltindilaurate | 9 |
| Portion 2 | |
| "Desmodur" N Solution (75% solids solution of the biuret of hexamethylene diisocyanate in a 1:1 solvent blend of xylol and "Cellosolve" acetate) | 190 |

| -continued | |
|---|---|
| | Parts by Weight |
| Total | 758 |

A white alkyd resin paint was prepared as described in Example 1 of U.S. Pat. No. 3,789,037, Column 4, line 57–Column 5, line 30.

White Paint A was formulated by blending the following:

| | Parts by Volume |
|---|---|
| White alkyd resin paint | 8 |
| Additive (A) | 1 |

White paint was formulated by blending the following:

| | Parts by Weight |
|---|---|
| White alkyd resin paint | 8 |
| Additive (B) | 1 |

A green metallic paint was formulated using the same constituents that were used to make the white alkyd resin paint except a green metallic mill base was substituted for the white mill base. A green metallic paint A and a green metallic paint B were formulated using the same formulations as shown above to make white paints A and B except the green metallic paint was substituted for the white paint.

A dark green paint was formulated using the same constituents that were used to make the white alkyd resin paint except a green mill base was substituted for the white mill base. A green paint A and a green paint B were formulated using the same formulations as shown above to make white paints A and B except the green paint was substituted for the white paint.

A blue metallic paint was formulated using the same constituents that were used to make the white alkyd resin paint exept a blue metallic mill base was substituted for the white mill base. A blue metallic paint A and a blue metallic paint B were formulated using the same formulations as shown above to make white paints A and B except the blue metallic paint was substituted for the white paint.

A silver paint was formulated using the same constituents that were used to make the white alkyd resin paint exept a silver mill base was substituted for the white mill base. A silver paint A and a silver paint B were formulated using the same formulations as shown above to make paints A and B except the silver paint was substituted for the white paint.

A red paint was formulated using the same constituents that were used to make the white alkyd resin paint except a red mill base was substituted for the white mill base. A red paint A and a red paint B were formulated using the same formulations as shown above to make white paints A and B except the red paint was substituted for the white paint.

Each of the above paints were sprayed onto a steel panel primed with 1 mil of an alkyd resin primer pigmented with iron oxide and having a 0.5 mil thick coating of black dip alkyd resin primer over the iron oxide primer. The coating was allowed to air dry. The resulting dried coating was about 2 mils thick.

The initial gloss at 20° and 60° and hardness in knoops was measured. The panels were then exposed to outdoor weathering in Florida and the 20° and 60° gloss again was measured after 6 months, 9 months and 12 months. The data is recorded in the Table.

The data shows that initial 20° and 60° gloss and hardness was higher using additive A of this invention in comparison to the prior art additive B. The available data generally shows that the 20° and 60° gloss after weathering for 6, 9 and 12 months was substantially higher with the additive of this invention in comparison to the prior art additive B.

TABLE

| Alkyd Resin Paint | Additive | Initial 20°/60° Gloss | Initial Hardness (knoops) | Gloss After Outdoor Weathering | | |
|---|---|---|---|---|---|---|
| | | | | 6 Mos 20°/60° Gloss | 9 Mos 20°/60° Gloss | 12 Mos 20°/60° Gloss |
| White | A Invention | 92/97 | 2.5 | 71/89 | — | 8/46 |
| White | B Prior Art | 86/95 | 0.7 | 51/83 | — | 2/26 |
| Green Met. | A Invention | 64/91 | 2.2 | 17/56 | 5/26 | — |
| Green Met. | B Prior Art | 59/88 | 1.5 | 12/47 | 5/22 | — |
| Dark Green | A Invention | 84/93 | 1.3 | 61/87 | 15/54 | — |
| Dark Green | B Prior Art | 78/91 | <0.7 | 37/71 | 4/39 | — |
| Blue Met. | A Invention | 74/93 | 1.7 | 40/75 | 12/44 | — |
| Blue Met. | B Prior Art | 55/87 | 0.7 | 28/67 | 9/33 | — |
| Silver | A Invention | 88/97 | 2.5 | 13/50 | — | 2/8 |
| Silver | B Prior Art | 72/94 | 0.6 | 7/40 | — | 1/6 |
| Red | A Invention | 81/94 | 5.6 | 7/42 | 0/9 | — |
| Red | B Prior Art | 46/81 | 1.9 | 1/30 | 0/16 | — |

I claim:

1. An additive for alkyd resin coating compositions consisting essentially of about 10–50% by weight of isocyanato isocyanurate having the formula

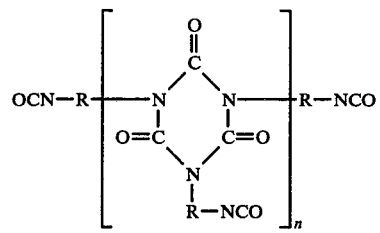

wherein R is

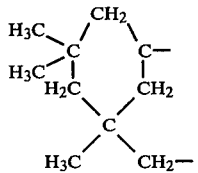

and n is an integer of 1–5,
wherein the isocyanato isocyanurate is formed from 3-isocyanatomethyl-3,5,5-trimethyl-cyclohexyl isocyanate and has an isocyanate functionality of 3.0–4.0;

0.5–5% by weight of dibutyltindilaurate and 49.5–89.5% by weight of an organic solvent.

2. The additive of claim 1 in which the solvent is toluene.

3. The additive of claim 1 consisting essentially of about

25–30% by weight of the isocyanato isocyanate of 3-isocyanatomethyl-3,5,5-trimethyl-cyclohexyl isocyanate and has an isocyanate functionality of 3.0–4.0, 1–3% by weight dibutyltindilaurate and 69–74% by weight of toluene.

4. A coating composition having an alkyd resin binder containing about 1–50% by weight, based on the weight of the coating composition, of the additive of claim 1.

5. The coating composition of claim 4 in which the alkyd resin consists essentially of drying oil or drying fatty acids, an ester of an organic dicarboxylic acid or anhydride and an ester of an aromatic monocarboxylic acid and a polyol.

6. The coating composition of claim 5 containing in addition to the alkyd resin about 1–15% by weight, based on the weight of the binder, of an alkylated melamine formaldehyde crosslinking resin.

7. A coating composition comprising about 10–60% by weight of a binder of an alkyd resin, an organic solvent and pigments in a pigment to binder weight ratio of about 1:100 to 150:100; wherein the binder consists essentially of about 30–65% by weight, based on the weight of the binder, of a drying oil selected from the group consisting of tung oil, tall oil, linseed oil, dehydrated castor oil, soya oil and mixtures thereof, 30–50% by weight, based on the weight of the binder, of an ester of an organic dicarboxylic acid or anhydride and a polyol; said acid or anhydride being selected from the group consisting of maleic acid, maleic anhydride, phthalic acid, phthalic anhydride, isophthalic acid, terephthalic acid, succinic acid, glutaric acid, adipic acid, pimelic acid, suberic acid, azelaic acid, sebacic acid and mixtures thereof;

2–9% by weight, based on the weight of the binder, of an ester of an aromatic monocarboxylic acid and a polyol and 2–5% by weight, based on the weight of the binder of a polyol, wherein the polyol is selected from the group consisting of glycerol, ethylene glycol, propylene glycol, diethylene glycol, butane diol, trimethylol propane, trimethylol ethane, pentaerythritol, sorbitol, mannitol and mixtures thereof; and additionally contains about 1–15% by weight, based on the weight of the binder, of an alkylated melamine formaldehyde crosslinking agent; and contains 0.1–3% by weight, based on the weight of the binder, of an organo metallic drier; and the composition contains additionally about 1–50% by weight, based on the weight of the coating composition, of an additive consisting essentially of about 10–50% by weight, based on the weight of the additive, of isocyanato isocyanurate having the formula

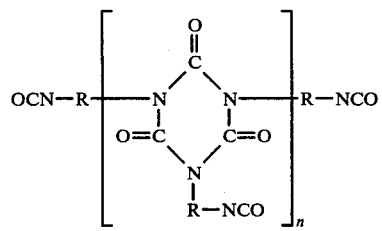

wherein R is

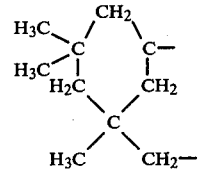

and n is an integer of 1–5,
wherein the isocyanato isocyanurate is formed from 3-isocyanatomethyl-3,5,5-trimethyl-cyclohexyl isocyanate and has an isocyanate functionality of 3.0–4.0;

0.5–5% by weight, based on the weight of the additive, of dibutyltindilaurate and 49.5–89.5% by weight, based on the weight of the additive, of an organic solvent.

* * * * *